(12) United States Patent
Rosenthal et al.

(10) Patent No.: US 11,028,290 B2
(45) Date of Patent: Jun. 8, 2021

(54) HEAT-APPLIED GAP FINISHING TAPE

(71) Applicant: UNITED STATES GYPSUM COMPANY, Chicago, IL (US)

(72) Inventors: Guy Rosenthal, Wheaton, IL (US); Terry Rosenstiel, Vernon Hills, IL (US); Salvatore Immordino, Trevor, WI (US); Robert Negri, Lake Villa, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 16/380,381

(22) Filed: Apr. 10, 2019

(65) Prior Publication Data
US 2019/0382621 A1 Dec. 19, 2019

Related U.S. Application Data

(60) Provisional application No. 62/685,385, filed on Jun. 15, 2018.

(51) Int. Cl.
*C09J 7/20* (2018.01)
*C09J 7/28* (2018.01)
(Continued)

(52) U.S. Cl.
CPC .............. *C09J 7/205* (2018.01); *C09J 7/28* (2018.01); *C09J 7/35* (2018.01); *C09J 7/405* (2018.01); *C09J 2203/00* (2013.01); *C09J 2301/416* (2020.08); *C09J 2400/163* (2013.01); *C09J 2400/28* (2013.01); *Y10T 428/1438* (2015.01)

(58) Field of Classification Search
CPC ....... C09J 7/205; C09J 7/28; C09J 7/35; C09J 2400/28; C09J 2400/163; C09J 2201/28; C09J 2201/61; C09J 2205/31; C09J 2203/30; C09J 2301/204; C09J 2301/304; C09J 2301/416; C09J 2203/00; E04F 13/042; E04F 13/06; E04F 2013/063
See application file for complete search history.

(56) References Cited

U.S. PATENT DOCUMENTS 2,916,398 A 12/1959 Marvin
3,093,886 A 6/1963 Petnel
(Continued)

FOREIGN PATENT DOCUMENTS

CA 2237349 A1 11/1998

OTHER PUBLICATIONS

International Application No. PCT/US2019/037029, International Search Report and Written Opinion, dated Sep. 12, 2019.

*Primary Examiner* — Patricia L. Nordmeyer
(74) *Attorney, Agent, or Firm* — Marshall, Gerstein & Borun LLP

(57) ABSTRACT

A gap finishing tape for use with drywall applications includes a trim strip body extending along a central body axis, a hot melt adhesive extending along the central body axis, and a backing paper. The trim strip body includes a first surface, a second surface opposite the first surface, a first side, and a second side opposite the first side, and is at least partially constructed from a metallic material. The backing paper is at least partially secured to the second surface of the trim strip body. The trim strip body is at least partially embedded in the hot melt adhesive.

11 Claims, 2 Drawing Sheets

(51) Int. Cl.
*C09J 7/35* (2018.01)
*C09J 7/40* (2018.01)

(56) References Cited

U.S. PATENT DOCUMENTS

| | | | |
|---|---|---|---|
| 4,424,246 A * | 1/1984 | Pieslak | F16L 47/22 |
| | | | 428/63 |
| 5,747,107 A | 5/1998 | Bayer, Jr. et al. | |
| 6,223,486 B1 | 5/2001 | Dunham | |
| 6,295,776 B1 | 10/2001 | Kunz et al. | |
| 8,291,663 B2 | 10/2012 | Banta | |
| 9,377,160 B1 | 6/2016 | Smythe et al. | |
| 9,388,582 B1 | 7/2016 | Smythe | |
| 9,476,206 B2 | 10/2016 | Miller | |
| 2004/0023002 A1 | 2/2004 | Wyndham et al. | |
| 2007/0254151 A1 | 11/2007 | Colucci | |
| 2015/0089893 A1 | 4/2015 | Rosenthal | |
| 2015/0284543 A1 | 10/2015 | Hargrove et al. | |
| 2017/0314274 A1 | 11/2017 | Rosenthal et al. | |

* cited by examiner

HEAT-APPLIED GAP FINISHING TAPE

CROSS REFERENCE TO RELATED APPLICATIONS

This application claims the benefit of U.S. Provisional Application No. 62/685,385, filed on Jun. 15, 2018, the entirety of which is herein expressly incorporated by reference.

FIELD OF THE DISCLOSURE

The present disclosure generally relates to a joint tape for joining at least two sheets of drywall.

BACKGROUND

During the construction process, multiple pieces of board or panels (e.g., drywall or gypsum panels) can be used to form walls, ceilings, floors, partitions, and the like. When multiple panels abut each other, a gap or seam, referred to as a "joint", is defined between the boards. Typically, a joint or finishing tape is used to cover the joint when finishing drywall to provide a flat, finished, and clean appearance to the wall or surface.

Modular construction is a growing trend in residential and commercial building applications. For a number of reasons, as the modules are assembled, it is practical to leave a small, but significant (e.g., up to approximately 3"), gap on an interior or exterior side of the surface. Such a substantial gap may require more robust finishing than an ordinary gap between wallboards in conventional frame construction environments, which typically have gap sizes of approximately 0.5". Conventional finishing approaches may result in a weak seam in the wall that may be easily broken through and/or may be visibly damaged even by routine impact. Accordingly, the wallboard panels may require frequent repairs, thus increasing overall construction costs and upkeep.

SUMMARY

In accordance with one embodiment of the present disclosure, a gap finishing tape for use with drywall applications includes a trim strip body extending along a central body axis, a hot melt adhesive extending along the central body axis, and a backing paper. The trim strip body includes a first surface and a second surface opposite the first surface and is at least partially constructed from a metallic material. The hot melt adhesive includes a first surface, a second surface opposite the first surface, a first side, and a second side opposite the first side. The backing paper is at least partially secured to the second surface of the trim strip body. The trim strip body is at least partially embedded in the hot melt adhesive.

In some approaches, trim strip body may have a first width, and the hot melt adhesive may have a second width. The first width may be less than the second width such that the hot melt adhesive extends beyond the width of the trim strip body. The trim strip body may also have a first thickness, and the hot melt adhesive may have a second thickness. In these examples, the first thickness is less than the second thickness such that the entire thickness of the trim strip body is fully embedded in the hot melt adhesive.

In some approaches, the backing paper is constructed from at least one of a nonwoven paper, a fiberglass mesh, or a polymer film. The backing paper may be at least partially secured to the second surface of the hot melt adhesive via lamination. Similarly, the hot melt adhesive may be laminated onto the trim strip body. In some forms, a portion of the backing paper may be secured to the second surface of the hot melt adhesive without an intervening layer of adhesive material.

The hot melt adhesive may have a thickness between approximately 0.005" and approximately 0.025". The trim strip body may have a thickness between approximately 0.003" and approximately 0.020". Other examples are possible.

In some of these examples, the hot melt adhesive is dimensioned such that a first thickness between the first surface and the second surface at the central body axis is greater than a second thickness between the first surface and the second surface at the first side and the second side. The hot melt adhesive may have a trapezoidal cross-section. Other examples of suitable cross-sectional shapes are possible.

In accordance with another embodiment of the present disclosure, an approach for forming a gap-finishing tape for use in connection with drywall applications includes forming a trim strip body, embedding the trim strip body into a first surface of a hot melt adhesive, and securing a backing paper to the hot melt adhesive. The trim strip body extends along a central body axis and has a first surface, a second surface, a first side, and a second side. Further, the trim strip body is constructed from a metallic material. The hot melt adhesive extends along the central body axis and further has a second surface opposite the first surface. The backing paper is secured to the second surface of the hot melt adhesive.

BRIEF DESCRIPTION OF THE DRAWINGS

The above approaches are at least partially met through provision of the non-swelling reinforced drywall joint tape described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, a gap finishing tape is provided for use with drywall panels. The gap finishing tape secures adjacent wallboard panels having a substantial gap (e.g., approximately 3") between facing edges. Advantageously, the gap finishing tape is at least partially constructed from a metallic material, and thus can withstand contact and forces while avoiding damage to the wallboard. Specifically, a metal trim strip body is embedded into a hot melt adhesive, thereby resulting in a wall side surface that can be flat and easily applied to minimize visual disturbances along the wall surface while providing a strong and abuse resistant tape. Further, the use of a hot-melt adhesive may eliminate the need to use additional products (e.g., a joint compound) to secure the finishing tape to the wallboard. Accordingly, the time required for the finishing tape to be adequately secured to the wallboard may also be reduced, which may lead to a more efficient construction process. By using a joint tape constructed from dimensionally stable materials, preparation times may be further reduced due to no longer needing to account for the finishing tape expanding and contracting after coming into contact with the joint compound.

Figure 1:
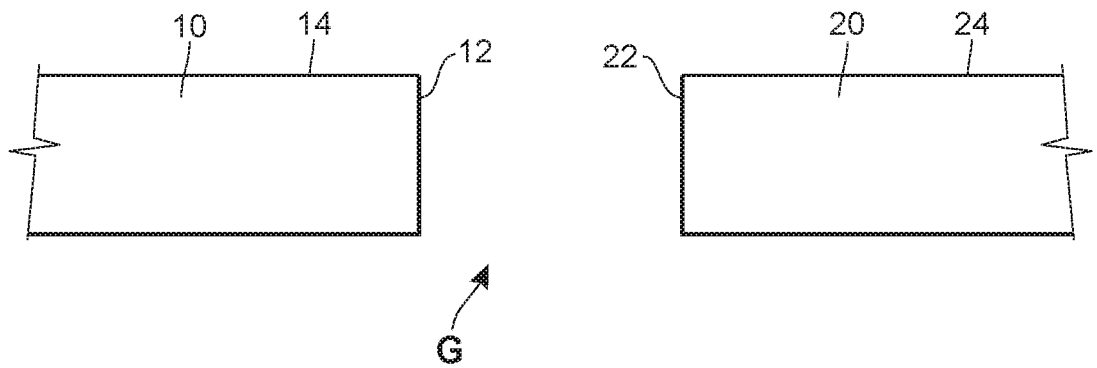
FIG. 1 illustrates a cross-sectional view of an example wall section constructed from wallboard panels in accordance with various embodiments of the present disclosure.

Referring now to the drawings, and in particular to FIG. 1, a first drywall panel 10 includes an edge 12 and an exposed surface 14, and a second drywall panel 20 includes an edge 22 and an exposed surface 24. In some construction environments such as modular construction processes, the edge 12 of the first drywall panel 10 may be spaced apart from the edge 22 of the second drywall panel 20 to form a wall section having a defined gap "G". The gap G may have a width of approximately 3". Other examples of widths are possible. The first drywall panel 10 and the second drywall panel 20 may have any number of configurations and/or dimensions desired for particular applications.

Figure 2:
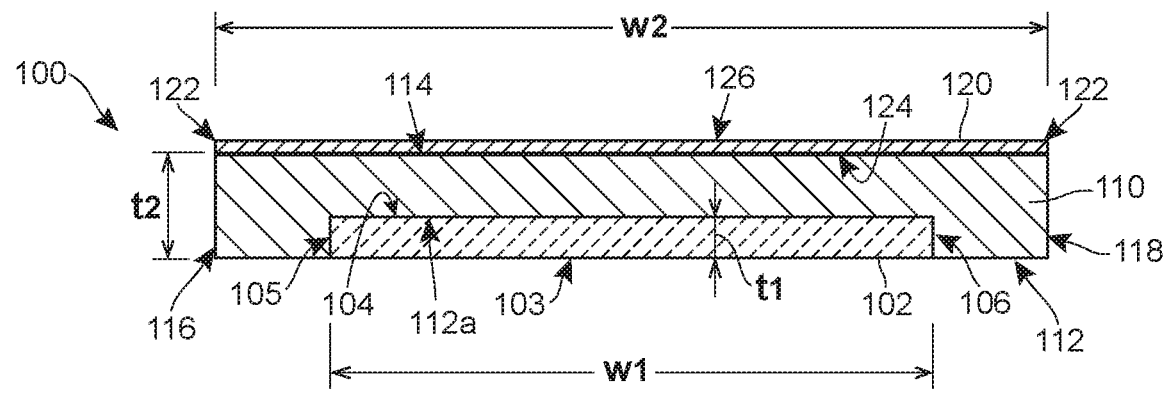
FIG. 2 illustrates a cross-sectional view of an example gap finishing tape in accordance with various embodiments of the present disclosure.
Figure 3:
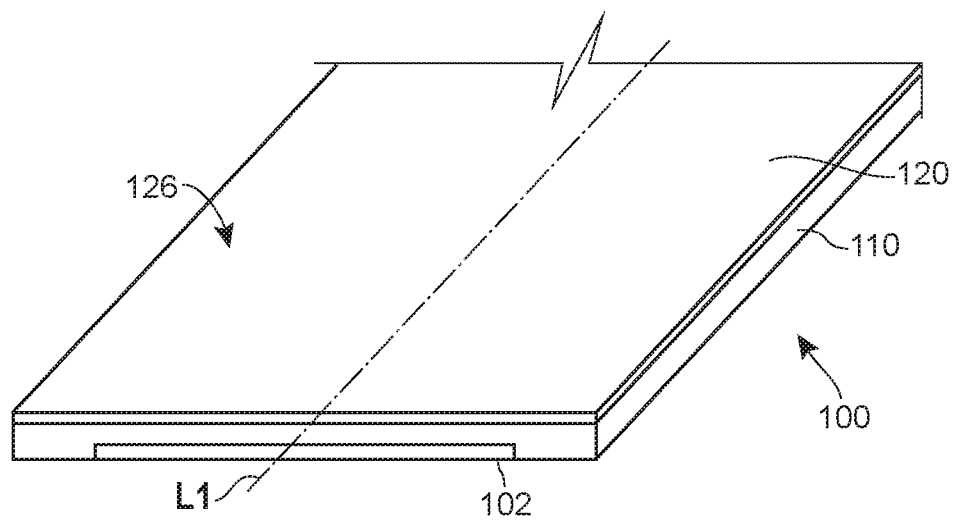
FIG. 3 illustrates a perspective view of the gap finishing tape of FIG. 2 in accordance with various embodiments of the present disclosure.
Figure 4:
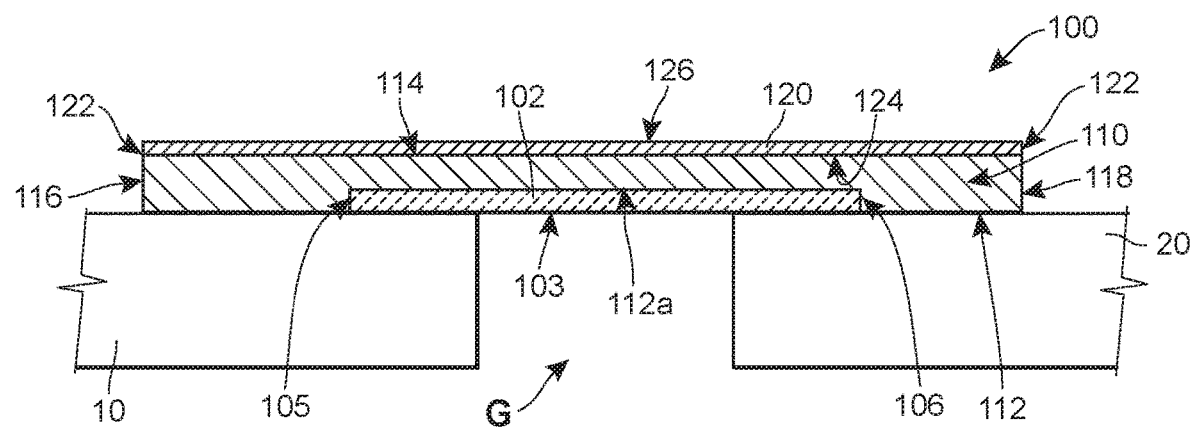
FIG. 4 illustrates a cross-sectional view of the gap finishing tape of FIGS. 2 and 3 applied to the example wall section of FIG. 1 in accordance with various embodiments of the present disclosure.

Turning to FIGS. 2-4, a gap finishing tape 100 is provided to span the gap G defined by the edges 12, 22 of the first and second panels 10, 20, respectively. The gap finishing tape 100 includes a trim strip body 102, a hot melt adhesive 110, and a backing paper 120. The trim strip body 102 extends along a central body axis L1 (FIG. 3) and includes a first surface 103 (i.e., the lower surface as oriented in FIG. 2), a second surface 104 (i.e., the upper surface as oriented in FIG. 2) opposite the first surface 103, a first side 105 (i.e., the left side as oriented in FIG. 2), and a second side 106 (i.e., the right side as oriented in FIG. 2) opposite the first side 105. The trim strip body 102 has a thickness t1 and a width w1. In some examples, the thickness t1 of the trim strip body 102 is between approximately 0.005" and approximately 0.020", preferably between approximately 0.009" and approximately 0.015". In some examples, the width w1 of the trim strip body 102 is between approximately 0.75" and approximately 6", preferably between approximately 1" and approximately 5". Other examples are possible. The first surface 103 is configured to span the width of the gap G formed by the first and second panels 10, 20, and, as will be discussed in further detail, the second surface 104 is generally configured to be embedded into the hot melt adhesive 110. Further, the first and second sides 105, 106 extend laterally along the central body axis L1, and also may be embedded in the hot melt adhesive 110.

The hot melt adhesive 110 also extends along the central body axis L1 and includes a first surface 112 (i.e., the lower surface as oriented in FIG. 2), a second surface 114 (i.e., the upper surface as oriented in FIG. 2) opposite the first surface 112, a first side 116 (i.e., the left side as oriented in FIG. 2), and a second side 118 (i.e., the right side as oriented in FIG. 2). Further, the hot melt adhesive 110 has a thickness t2 and a width w2. In some examples, the thickness t2 of the hot melt adhesive 110 is between approximately 0.007" and approximately 0.020", preferably between approximately 0.01" and approximately 0.017". In some examples, the width w2 of the hot melt adhesive 110 is between approximately 1.75" and approximately 7", preferably between approximately 2" and approximately 6". Other examples are possible.

The backing paper 120 has outer edges 122, a first surface 124 (i.e., the lower surface as oriented in FIG. 2) and a second surface 126 (i.e., the upper surface as oriented in FIG. 2). The first surface 124 of the backing paper 120 is at least partially secured to the second surface 114 of the hot melt adhesive 110 via any number of approaches as will be discussed, such as, for example, lamination. The backing paper 120 may have a similar width dimension as the width of the hot melt adhesive 110, and may have a thickness between approximately 0.003" and approximately 0.01", preferably between approximately 0.005" and approximately 0.01".

The trim strip body 102 may be constructed from any number and/or combination of suitable materials. In some examples, the trim strip body 102 is constructed from a metallic material such as steel, aluminum, zinc, and the like. The trim strip body 102 may include any number of fillers such as calcium carbonate, fly ash, silica fume, carbon, and/or other materials to adjust its physical properties and/or manufacturing cost. The trim strip body 102 is generally formed in an elongated strip having any desirable length dimension with a generally rectangular cross-section.

The hot melt adhesive 110 may be constructed from of a polymer material (e.g., a thermo-formable polymer) having a melting point range between about 250° F. and about 400° F. Generally, the hot melt adhesive 110 may be formed to have similar, but larger, dimensions as the trim strip body 102 and may be formed in elongated strips with a generally rectangular cross section. In some examples, the polymer used is DHM 5000 FA40, which is commercially available from DHM Adhesives Inc. of Calhoun, Ga., USA. Other examples of suitable polymers are possible. The polymer may be a pure polymer or may include any number of fillers to provide desired characteristics such as increased flexibility, increased rigidity, decreased shrinkage, flame retardation, and the like. For example, some fillers may include calcium carbonate, silica, titanium oxide, colorants, carbon, glass, Kevlar, silanes, titanates, chlorine, bromine, and any other known fillers. Approaches and applications of the hot melt adhesive 110 are described in U.S. application Ser. No. 15/376,176, entitled "FORMABLE CORNER FINISHING AND TRIM STRIP", filed on Dec. 12, 2016, and U.S. application Ser. No. 15/434,980, entitled "DRYWALL TRIM PIECE OR TAPE ATTACHED WITH HEATED ADHESIVE", filed on Feb. 16, 2017, the contents of which are herein incorporated by reference in their entirety.

The backing paper 120 may be constructed from at least one of a nonwoven paper, a fiberglass mesh, or a polymer film. Other examples are possible.

The backing paper 120 may be secured to the hot melt adhesive 110 via any number of suitable approaches. In one example, a lamination process may be employed. In this example, at least the second surface 114 of the hot melt adhesive 110 is first heated to a temperature within its melting point range, and is then pressed against the backing paper 120 to form a bond therebetween. Specifically, upon the hot melt adhesive 110 being within the desired temperature within its melting point range, the second surface 114 of the hot melt adhesive 110 is pressed against the first surface 124 of the backing paper. This coupling process may be completed using any suitable device such as, for example, a rolling, extrusion, and/or a conveyor system. Upon the hot melt adhesive 110 cooling to a temperature below its melting point range, the hot melt adhesive 110 is bonded to the backing paper 120.

The trim strip body 102 may be secured to the hot melt adhesive 110 via a similar approach as the approach used to secure the backing paper 120 to the hot melt adhesive 110. Specifically, upon at least the first surface 112 of the hot melt adhesive 110 being heated to a temperature within its melting point range, the second surface 104 of the trim strip body 102 is pressed onto the first surface 112 of the hot melt adhesive 110. In this step, the trim strip body 102 is pressed against the hot melt adhesive 110 with a sufficient force to cause the trim strip body 102 to be embedded into the hot melt adhesive 110. Specifically, the trim strip body 102 causes a portion 112a of the first surface 112 of the hot melt adhesive 110 to displace a distance into the volume thereof. In the illustrated example, the portion 112a of the first surface 112 of the hot melt adhesive is displaced a dimension approximately equal to the thickness t1 of the trim strip body 102. Accordingly, the first surface 103 of the trim strip body 102 is flush with the first surface 112 of the hot melt adhesive 110 that was not displaced by the trim strip body 102. In some examples, the trim strip body 102 may not be fully embedded into the hot melt adhesive 110; accordingly, the first surface 103 of the trim strip body 102 may not be flush with the first surface 112 of the hot melt adhesive 110 that was not displaced by the trim strip body 102. In still other examples, the trim strip body 102 may be embedded to a depth greater than the thickness t1, and accordingly, a gap or void may be formed between the first surface 103 of the trim strip body 102 and a plane occupying the undisplaced first surface 112 of the hot melt adhesive 110.

In some approaches, the steps of securing the backing paper 120 to the hot melt adhesive 110 and securing/embedding the trim strip body 102 to the hot melt adhesive 110 may be completed in a single step. In other words, upon heating at least both the first and second surfaces, 112, 114, the hot melt adhesive 110 to a temperature within its melting point range, both the trim strip body 102 and the backing paper 120 are pressed onto and/or into the hot melt adhesive 120, thereby reducing production times associated with heating the hot melt adhesive 110 multiple times.

As illustrated in FIGS. 2-4, the width w1 of the trim strip body 102 is less than the width w2 of the hot melt adhesive 110. Accordingly, when placing the gap finishing tape 100 on wallboard panels 10, 20 to cover the gap G, the width w1 of the trim strip body 102 will span the length of the gap G, and the width w2 of the hot melt adhesive 110 will extend outwardly beyond the width w1 of the trim strip body 102. The gap finishing tape 100 will thereby provide a strong junction between adjacent panels 10, 20.

In these examples, because a hot melt adhesive 110 is used, to secure the gap finishing tape 110 to the wallboard panels 10, 20, the hot melt adhesive 110 is again heated to a temperature within its melting point range. Upon the hot melt adhesive 110 being in a temperature within its melting point range, the first surface 112 of the gap finishing tape 100 is pressed against the wallboard panels 10, 20 using any number of suitable tools and/or devices. Upon the hot melt adhesive 110 cooling to a temperature below its melting point range, the hot melt adhesive 110, and thus the gap finishing tape 100, is adhered to the wallboard panels 10, 20. If desired, joint compound (not illustrated) may then be applied to the second surface 126 of the backing paper and the wallboard panels 10, 20 to create a smooth, seamless transition between panels. Further, in some examples, joint compound or any other adhesive (not illustrated) may first be placed on the wallboard panels 10, 20 and/or on a portion of the first surfaces 103, 112 of the trim strip body 102 and/or the hot melt adhesive 110, respectively prior to placing the gap finishing tape 110 onto the wallboard panels 10, 20.

Figure 5:
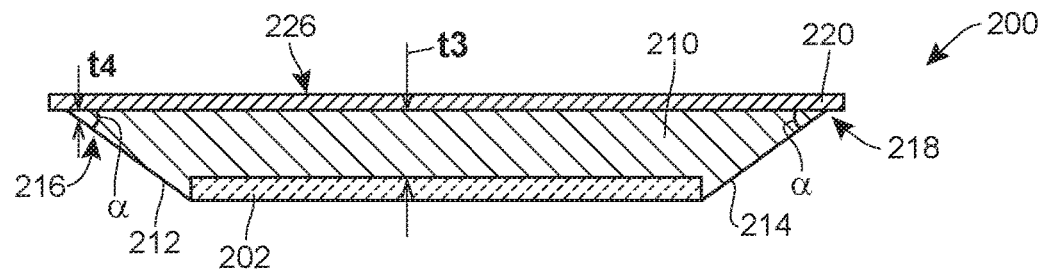
FIG. 5 illustrates a cross-sectional view of an alternative gap finishing tape in accordance with various embodiments of the present disclosure.
Figure 6:
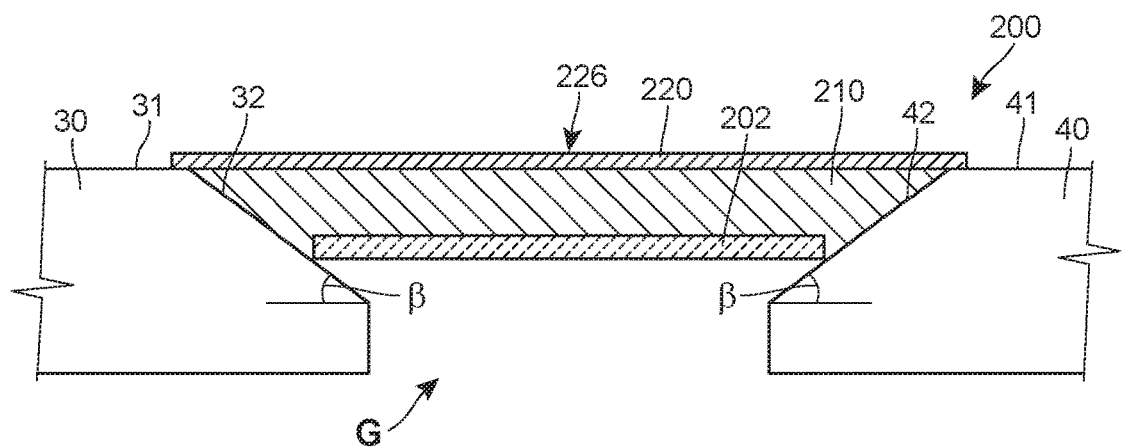
FIG. 6 illustrates a cross-sectional view of the alternative gap finishing tape of FIG. 5 applied to an example wall section having a tapered portion in accordance with various embodiments of the present disclosure.

Turning to FIGS. 5 and 6, an alternative gap finishing tape 200 is provided that has a tapered profile. Such a profile may be suitable for applications in which wallboard panels 30, 40 have tapered portions 32, 42, respectively, located at a plane disposed below an exposed surface 31, 41. The alternative gap finishing tape 200 includes many of the features of the gap finishing tape 100 of FIGS. 1-4, and accordingly, for the sake of brevity, details regarding the construction and orientation of these components will not be discussed in further detail.

The gap finishing tape 200 has a varying, tapered thickness. Specifically, the hot melt adhesive 210 has a first thickness t3 along the central body axis, and a second thickness t4 at the first and second sides 216, 218. In the illustrated example, the first thickness t3 is greater than the second thickness t4 such that a cross-section of the trim strip body 102 is generally trapezoidal in shape. In some examples, the first thickness t3 may be between approximately 0.007" and approximately 0.020", preferably between approximately 0.01" and approximately 0.017". Further, in some examples, the second thickness t4 may be between approximately 0.005" and approximately 0.017", and preferably between approximately 0.0075" and approximately 0.015". In other examples, the first thickness t3 is approximately 50% greater than the second thickness t4. In some forms, the thickness at the first side 216 may be different than the thickness at the second side 218. As illustrated in FIG. 5, angled surfaces 212, 214 of the tapered gap finishing tape 200 form an angle α relative to the second surface 214. Similarly, as illustrated in FIG. 6, the tapered portions 32, 42 of the wallboard panels 30, 40, respectively, form an angle β relative to the illustrated horizontal plane. The angle α is configured to be approximately equal to the angle β formed by the wallboard panels 30, 40. In some examples, the angle β is approximately 30°, and thus, the angle α is approximately 30°. Other examples are possible.

So configured, the tapered gap finishing tape 200 may be shaped and dimensioned to closely match the shape and dimensions of the void region formed by the first and second panels 30, 40, and therefore, the gap finishing tape 200 will occupy a substantial volume (e.g., between approximately 50% and approximately 99%) of the void region, regardless of its dimensions and/or shape. Other examples of suitable dimensions t3, t4 may be used to accommodate the void region formed by the first and second panels 30, 40.

In this example, application of the tapered gap finishing tape 200 is similar to that of the gap finishing tape 100 previously described. During installation, angled surfaces 212, 214 abut corresponding angled surfaces 32, 42 of wallboard panels 30, 40 (see FIG. 6). Accordingly, the tapered gap finishing tape 200 is substantially disposed at a level that is lower than the plane formed by upper surfaces 31, 41 of the wallboard panels 30, 40. In some applications, and as illustrated, the backing paper 220 may at least partially extend onto the upper surfaces 31, 41 of the wallboard panels 30, 40. However, in other applications, the backing paper 220 may also be positioned such that its upper surface 226 is disposed at the same plane as the upper surfaces 31, 41 of the wallboard panels 30, 40. In any of these examples, joint compound may be applied to the upper surface 226 of the backing paper 220 and/or the upper surfaces 31, 41 of the wallboard panels 30, 40 to create a smooth transition and appearance.

The tapered hot melt adhesive 210 shown and described includes generally planar tapered surfaces 212, 214, but in other configurations, these surfaces 212, 214 could be concave for receiving an adhesive and/or joint compound during installation. In other versions, these surfaces 212, 214 can be textured and/or porous for the same purpose. Further, while the hot melt adhesive 210 disclosed herein has a trapezoidal shape cross-section, other versions could be shaped differently. For example, in other versions, the tapered hot melt adhesive 210 could be partially circular or arcuate, or any other suitable shape.

In some approaches, desired surfaces of the trim strip body 102, 202 may optionally be textured, roughened and/or porous to promote bonding with an adhesive and/or joint compound during installation.

In some examples, the gap finishing tape 100, 200 of the present disclosure may be configured in a corner bead arrangement to be placed on adjacent drywall panels that form an angle other than 180°. In such a configuration, both the trim strip body 102, 202 and the hot melt adhesive 110, 210 may form a right angle or any other desired angle to protect the formed corner between adjacent drywall panels. Other examples and configurations are possible.

Although not described above, the gap finishing tape 100, 200 of the present disclosure could be sold in sticks of predetermined length, for example in bundles. In other versions, where the trim strip body 102, 202 is flexible, the gap finishing tape 100, 200 could be sold in rolls. In some examples, the gap finishing tape 100, 200 may be applied to exterior surfaces of modular construction units to eliminate unsightly gaps and may additionally act as a protective barrier for these exterior gaps. In these examples, the gap finishing tape 100, 200 may secure to any number of materials such as, for example, a particle or fiber board, a metal sheet, and the like. In these examples, the gap finishing tape 100, 200 may still adhere to the exterior surface via the hot melt adhesive.

Unless specified otherwise, any of the feature or characteristics of any one of the embodiments of the non-swelling reinforced drywall joint tape disclosed herein may be combined with the features or characteristics of any other embodiments of the non-swelling reinforced drywall joint tape.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A gap-finishing tape for use in connection with drywall applications, the gap finishing tape comprising:
   a trim strip body extending along a central body axis, the trim strip body having a first surface and a second surface opposite the first surface, the trim strip body being constructed from a metallic material;
   a hot melt adhesive extending along the central body axis and having a first surface, a second surface opposite the first surface, a first side, and a second side opposite the first side; and
   a backing paper at least partially secured to the second surface of the hot-melt adhesive;
   wherein the trim strip body is at least partially embedded into the first surface of the hot melt adhesive such that the entire first surface of the trim strip body is exposed and free of hot melt adhesive such that at least a portion of the first surface of the trim strip body is configured to contact a surface of a drywall panel.

2. The gap-finishing tape of claim 1, wherein the trim strip body has a first width and the hot melt adhesive has a second width, wherein the first width is less than the second width such that the hot melt adhesive extends beyond the width of the trim strip body.

3. The gap-finishing tape of claim 1, wherein the trim strip body has a first thickness and the hot melt adhesive has a second thickness, wherein the first thickness is less than the second thickness.

4. The gap-finishing tape of claim 1, wherein the backing paper is at least partially secured to the second surface of the hot melt adhesive via lamination.

5. The gap-finishing tape of claim 1, wherein the hot melt adhesive is laminated onto the trim strip body.

6. The gap-finishing tape of claim 1, wherein the backing paper is constructed from at least one of a nonwoven paper, a fiberglass mesh, or a polymer film.

7. The gap-finishing tape of claim 1, wherein the hot melt adhesive is dimensioned such that a first thickness between the first surface and the second surface at the central body axis is greater than a second thickness between the first surface and the second surface at the first side and the second side.

8. The gap-finishing tape of claim 1, wherein the hot melt adhesive has a trapezoidal cross-section.

9. The gap-finishing tape of claim 1, wherein the hot melt adhesive has a thickness between approximately 0.005" and approximately 0.025".

10. The gap-finishing tape of claim 1, wherein the trim strip body has a thickness between approximately 0.003" and approximately 0.020".

11. The gap-finishing tape of claim 1, wherein a portion of the backing paper is secured to the second surface of the hot melt adhesive without an intervening layer of adhesive material.

* * * * *